United States Patent
Koike (10) Patent No.: US 7,482,780 B2
(45) Date of Patent: Jan. 27, 2009

(54) DIAGNOSIS METHOD, POWER SUPPLY CONTROL DEVICE, ELECTRONIC APPARATUS, BATTERY PACK AND COMPUTER-READABLE STORAGE MEDIUM CAPABLE OF SETTING THE ELECTRONIC APPARATUS TO A DIAGNOSIS MODE

(75) Inventor: Nobuyuki Koike, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/706,982

(22) Filed: Feb. 16, 2007

(65) Prior Publication Data
US 2007/0139048 A1 Jun. 21, 2007

Related U.S. Application Data

(62) Division of application No. 10/949,336, filed on Sep. 27, 2004, now Pat. No. 7,439,705.

(30) Foreign Application Priority Data
Apr. 19, 2004 (JP) .............................. 2004-123381

(51) Int. Cl.
*H01M 10/44* (2006.01)
*H01M 10/46* (2006.01)
(52) U.S. Cl. .................................... 320/106
(58) Field of Classification Search ................. 320/106, 320/110, 112, 114, 132, 149; 324/426, 430, 324/433
See application file for complete search history.

(56) References Cited

U.S. PATENT DOCUMENTS 5,929,601 A 7/1999 Kaib et al.
6,005,367 A 12/1999 Rohde

FOREIGN PATENT DOCUMENTS

| JP | 11-299116 | 10/1999 |
|---|---|---|
| JP | 2001-122180 | 5/2001 |
| JP | 2002-169629 | 6/2002 |
| JP | 2002-223527 | 8/2002 |

OTHER PUBLICATIONS

U.S. Appl. No. 10/949,336, filed Sep. 27, 2004, Nobuyuki Koike, Fujitsu Limited.
Communication from the Japanese Patent Office mailed Jun. 3, 2008 in the corresponding Japanese patent application No. 2004-123381.

*Primary Examiner*—Edward Tso
(74) *Attorney, Agent, or Firm*—Staas & Halsey LLP (57) ABSTRACT

A diagnosis method diagnoses an electronic apparatus that is operable with a battery pack having a memory which stores information. The diagnosis method reads information from the battery pack, and sets the electronic apparatus to a diagnosis mode when the read information indicates the diagnosis mode.

16 Claims, 10 Drawing Sheets

DIAGNOSIS METHOD, POWER SUPPLY CONTROL DEVICE, ELECTRONIC APPARATUS, BATTERY PACK AND COMPUTER-READABLE STORAGE MEDIUM CAPABLE OF SETTING THE ELECTRONIC APPARATUS TO A DIAGNOSIS MODE

CROSS-REFERENCE TO RELATED APPLICATIONS

This application is a Divisional Application of and claims parent benefit under 35 U.S.C. §120 to application Ser. No. 10/949,336, filed Sep. 27, 2004, now U.S. Pat. No. 7,439,705, and claims priority benefit of Japanese Application No. 2004-123381, filed Apr. 19, 2004.

BACKGROUND OF THE INVENTION

This application claims the benefit of a Japanese Patent Application No. 2004-123381 filed Apr. 19, 2004, in the Japanese Patent Office, the disclosure of which is hereby incorporated by reference.

1. Field of the Invention

The present invention generally relates to diagnosis methods, power supply control devices, electronic apparatuses, battery packs and computer-readable storage media, and more particularly to a diagnosis method for diagnosing an electronic apparatus such as a lap-top (or portable) personal computer, a power supply control device and an electronic apparatus which employ such a diagnosis method, a battery pack that is used by such a diagnosis method, and a computer-readable storage medium that stores a program for causing a computer to carry out a diagnosis by such a diagnosis method.

2. Description of the Related Art

A program called Basic Input Output System (BIOS) which carries out a boot process of personal computers is embedded with a simple self-diagnosis function called Power On Self Test (POST). For example, the POST sends an 8-bit code corresponding to an initial setting or each stage of an initial diagnosis to an address $80h$ (80 in hexadecimal, 128 in decimal).

Extension slots are provided in desk-top personal computers, and when an extension card that displays data by decoding the address $80h$ is inserted into the extension slot, the extension card acts as an indicator that is used for the debugging. The indicator of the extension card is usable when a CPU and a BIOS-ROM that stores the BIOS are operating within the personal computer. For example, when the personal computer is started in a state where a main memory such as a RAM has failed, information such as a message indicating a memory error is indicated on the indicator of the extension card. Hence, in a case where a display to be made on a main display part of the personal computer is not displayed even when the power supply of the personal computer is turned ON, for example, it is possible to investigate the location of the failure within the personal computer based on the information that is indicated on the indicator of the extension card. A diagnosis which includes investigating the location of the failure within the personal computer is carried out when shipping the personal computer, and attending to the maintenance, checking or repair of the personal computer.

In a state where the main display part such as a CRT and/or an LCD of the personal computer is usable, it is unnecessary to use the indicator of the extension card. However, the performance of the main display part has dramatically improved in recent years, and highly complex processes are required even when only carrying out an initializing process. Furthermore, the main display part and a control circuit of the recent personal computer have become replaceable. For this reason, there is still a need for the indicator of the extension card.

On the other hand, lap-top personal computers are normally not provided with an extension slot as in the case of the desk-top personal computer described above. Consequently, in a case where the location of the failure within the lap-top personal computer cannot be investigated unless an indicator for debugging use is connected thereto, it becomes necessary to open a housing (or casing) of the lap-top personal computer and make the necessary connections. As a result, troublesome operations, such as removing screws, are required in order to carry out the diagnosis. Moreover, in the case of the lap-top personal computer having a housing which is uneasily opened, the operations that are required to carry out the diagnosis become even more complex and troublesome, and furthermore, the housing may be damaged when opening the housing.

It is conceivable to provide an extension slot in lap-top personal computers, similarly to the desk-top personal computers. However, since there are demands to reduce the size of the lap-top personal computers, there is a limit to the space within the lap-top personal computer that may be used to provide the extension slot. In addition, the cost of the lap-top personal computers will increase if the extension slot having a predetermined number of terminals were to be provided in the lap-top personal computers. Therefore, it is not practical to provide the extension slot in the lap-top personal computers. Although lap-top personal computers provided with a simplified extension slot having a small number of terminals have been proposed, it is still necessary to secure a space to provide the simplified extension slot, and further, there is a limit to the diagnosis performance that may be achieved if the number of terminals of the simplified extension slot is limited.

Some portable electronic apparatuses such as the lap-top personal computers can use a secondary, battery such as a battery pack, as a power supply. For example, a Japanese Laid-Open Patent Application No. 11-299116 proposes a charging process depending on the kind of secondary battery used. For example, a Japanese Laid-Open Patent Application No. 2002-169629 proposes an identification of the type of secondary battery. In addition, a Japanese Laid-Open Patent Application No. 2002-223527 proposes a judgement to determine whether or not the battery pack conforms to the electronic apparatus.

However, in the prior art, the information stored in the memory within the battery pack is used to identify the type of the secondary battery or to identify the power supply voltage. In the prior art, there is no concept of using information stored in the memory within the battery pack to start a diagnosis function of the electronic apparatus.

Therefore, the conventional electronic apparatuses have the following problems.

The conventional portable electronic apparatuses, such as the lap-top personal computers, are normally not provided with an extension slot such as that of the desk-top personal computers. For this reason, in a case where it is impossible to investigate the location of the failure within the lap-top personal computer unless a indicator for debugging use is connected to the lap-top personal computer, it becomes necessary to open the housing (or casing) of the lap-top personal computer and make the necessary connections. As a result, the troublesome operations, such as removing the screws, are required in order to carry out the diagnosis. Moreover, in the case of the lap-top personal computer having the housing which is uneasily opened, the operations that are required to carry out the diagnosis become even more complex and troublesome, and furthermore, the housing may be damaged when opening the housing.

Although it is conceivable to provide the extension slot in the lap-top personal computers, similarly to the desk-top personal computers, since there are demands to reduce the size of the lap-top personal computers, there is a limit to the space within the lap-top personal computer that may be used to provide the extension slot. In addition, the cost of the lap-top personal computers will increase if the extension slot having a predetermined number of terminals were to be provided in the lap-top personal computers. Therefore, it is not practical to provide the extension slot in the lap-top personal computers. Although the lap-top personal computers provided with a simplified extension slot having a small number of terminals have been proposed, it is still necessary to secure the space to provide the simplified extension slot, and further, there is a limit to the diagnosis performance that may be achieved if the number of terminals of the simplified extension slot is limited.

SUMMARY OF THE INVENTION

Accordingly, it is a general object of the present invention to provide a novel and useful diagnosis method, power supply control device, electronic apparatus, battery pack and computer-readable storage medium, in which the problems described above are suppressed.

Another and more specific object of the present invention is to provide a diagnosis method, a power supply control device, an electronic apparatus, a battery pack and a computer-readable storage medium, which enable diagnosis of an electronic apparatus without having to provide an extension slot.

Still another object of the present invention is to provide a diagnosis method for diagnosing an electronic apparatus that is operable with a battery pack having a memory which stores information, comprising the steps of (a) reading information from the battery pack; and (b) Setting the electronic apparatus to a diagnosis mode when the read information indicates the diagnosis mode. According to the diagnosis method of the present invention, it is possible to diagnose the electronic apparatus without having to provide an extension slot in the electronic apparatus.

A further object of the present invention is to provide a power supply control device for controlling a power supply of an electronic apparatus that is operable with a battery pack having a memory which stores information, comprising a reading part configured to read information from the battery pack; and an issuing part configured to issue an instruction that sets the electronic apparatus to a diagnosis mode when the read information indicates the diagnosis mode. According to the power supply control device of the present invention, it is possible to diagnose the electronic apparatus without having to provide an extension slot in the electronic apparatus.

Another object of the present invention is to provide an electronic apparatus operable with a battery pack which stores information, comprising a reading part configured to read information from the battery pack; and a setting part configured to set the electronic apparatus to a diagnosis mode when the read information indicates the diagnosis mode. According to the electronic apparatus of the present invention, it is possible to diagnose the electronic apparatus without having to provide an extension slot in the electronic apparatus.

Still another object of the present invention is to provide a battery pack for supplying a power supply voltage to an electronic apparatus, comprising a memory configured to store identification information of the battery pack; a battery part configured to supply the power supply voltage; one or more first terminals configured to input and output signals with respect to the memory; and two or more second terminals configured to input and output the power supply voltage with respect to the battery part, where the memory stores information for setting the electronic apparatus to a diagnosis mode in a manner readable via the first terminals. According to the battery pack of the present invention, it is possible to diagnose the electronic apparatus without having to provide an extension slot in the electronic apparatus.

A further object of the present invention is to provide a computer-readable storage medium which stores a program for causing a computer to set to a diagnosis mode an electronic apparatus that is operable with a battery pack having a memory which stores information, the program comprising a reading procedure causing the computer to read information from the battery pack; and an issuing procedure causing the computer to issue an instruction that sets the electronic apparatus to the diagnosis mode when the read information indicates the diagnosis mode. According to the computer-readable storage medium of the present invention, it is possible to diagnose the electronic apparatus without having to provide an extension slot in the electronic apparatus.

Another object of the present invention is to provide a diagnosis method for diagnosing an electronic apparatus that is operable with a detachable battery pack, comprising the steps of (a) judging a loaded battery pack; and (b) setting the electronic apparatus to a diagnosis mode when the step (a) judges that the loaded battery pack is a special battery pack. According to the diagnosis method of the present invention, it is possible to diagnose the electronic apparatus without having to provide an extension slot in the electronic apparatus.

Still another object of the present invention is to provide a power supply control device for controlling a power supply of an electronic apparatus that is operable with a detachable battery pack, comprising a judging part configured to judge a loaded battery pack; and a setting part configured to set the electronic apparatus to a diagnosis mode when the judging part judges that the loaded battery pack is a special battery pack. According to the power supply control device of the present invention, it is possible to diagnose the electronic apparatus without having to provide an extension slot in the electronic apparatus.

A further object of the present invention is to provide an electronic apparatus operable with a detachable battery pack, comprising a judging part configured to judge a loaded battery pack; and a setting part configured to set the electronic apparatus to a diagnosis mode when the judging part judges that the loaded battery pack is a special battery pack. According to the electronic apparatus of the present invention, it is possible to diagnose the electronic apparatus without having to provide an extension slot in the electronic apparatus.

Another object of the present invention is to provide a computer-readable storage medium which stores a program for causing a computer to set to a diagnosis mode an electronic apparatus that is operable with a detachable battery pack, the program comprising a judging procedure causing the compute to judge a loaded battery pack; and a setting procedure causing the computer to set the electronic apparatus to a diagnosis mode when the judging procedure judges that the loaded battery pack is a special battery pack. According to the computer-readable storage medium of the, present invention, it is possible to diagnose the electronic apparatus without having to provide an extension slot in the electronic apparatus.

Other objects and further features of the present invention will be apparent from the following detailed description when read in conjunction with the accompanying drawings.

DESCRIPTION OF THE PREFERRED EMBODIMENTS

A description will be given of embodiments of a diagnosis method, a power supply control device, an electronic apparatus, a battery pack and a computer-readable storage medium according to the present invention, by referring to the drawings.

Figure 1:
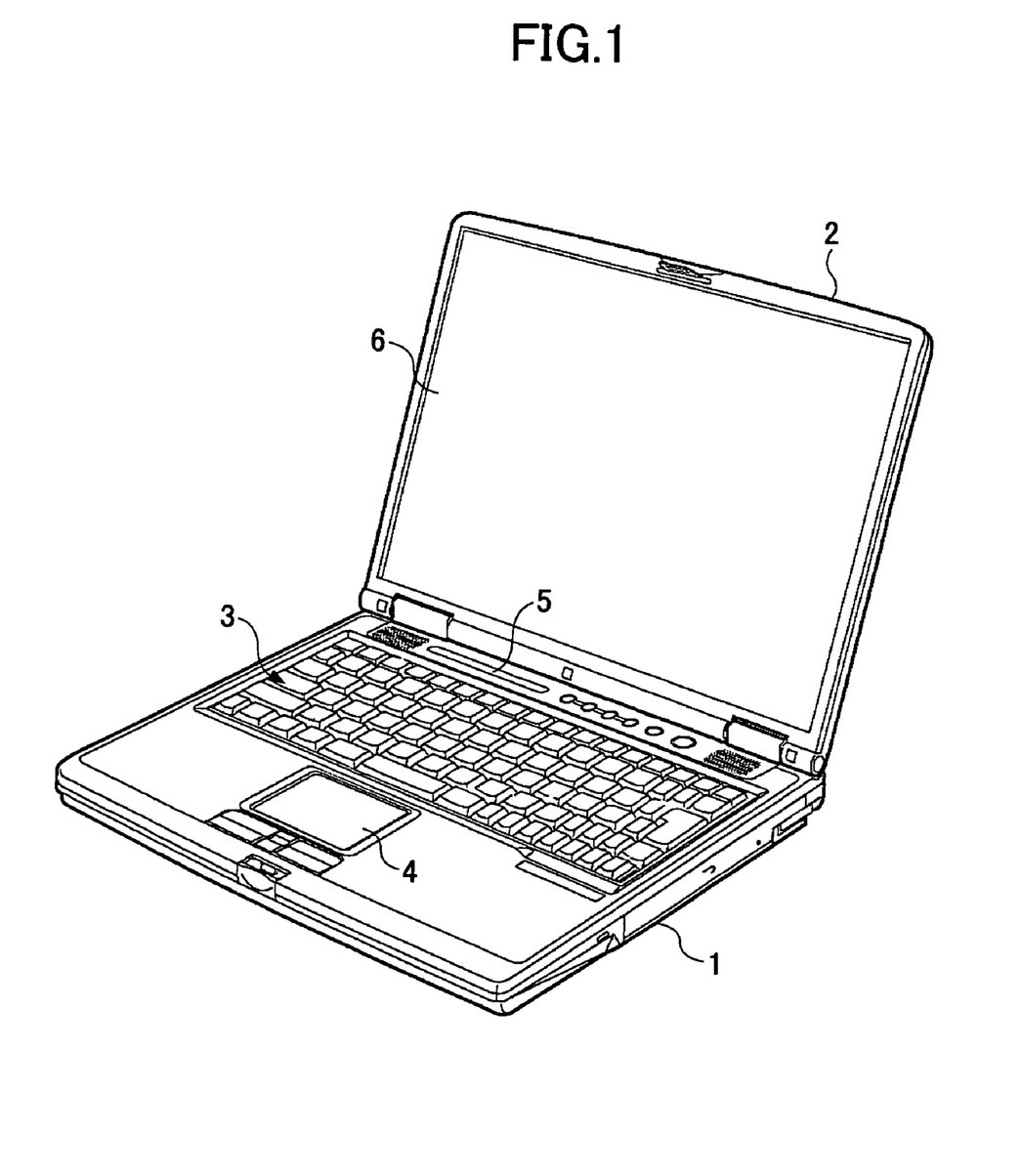
FIG. 1 is a perspective view showing an embodiment of an electronic apparatus in a state where a lid is open.

FIG. 1 is a perspective view showing an embodiment of the electronic apparatus in a state where a lid is open. In this embodiment, the present invention is applied to a lap-top personal computer.

The electronic apparatus shown in FIG. 1 includes a main body 1, and a lid 2 that can open and close with respect to the main body 1. The main body 1 is provided with a keyboard 3, a pointing device 4, and an auxiliary display part 5 made of an LCD or the like. The auxiliary display part 5 displays information related to states of the electronic apparatus, that is, status information, and the like. Because the auxiliary display part 5 displays the status information, it is sometimes also referred to as a status LCD. A main display part 6 made of an LCD or the like is provided on the inner side of the lid 2 so that the main display part 6 is visible when the lid 2 is opened as shown in FIG. 1.

Figure 2:
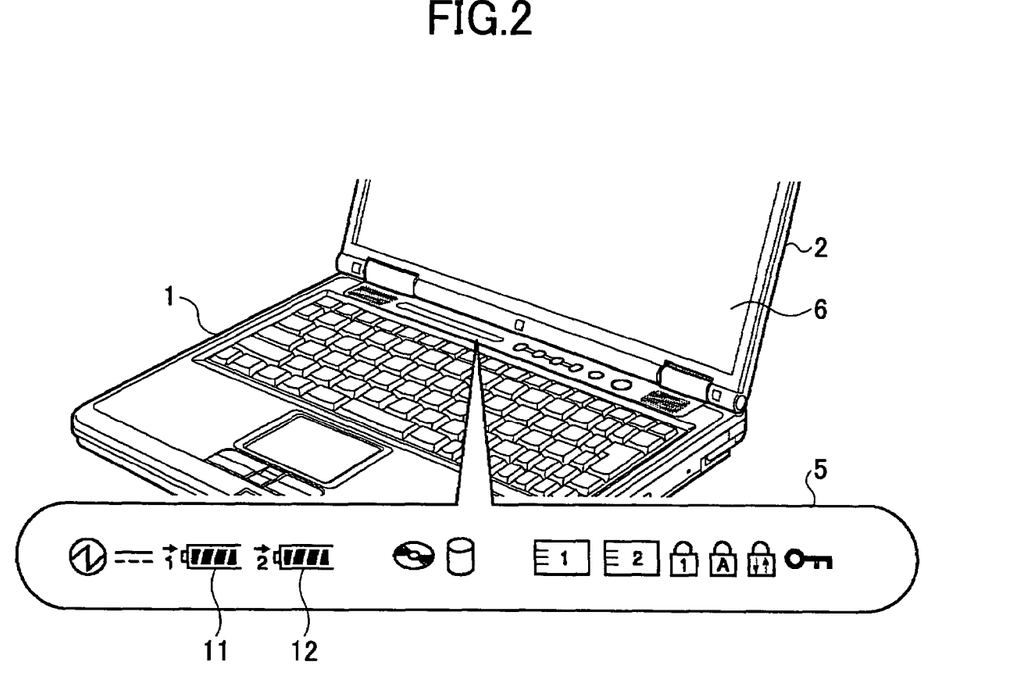
FIG. 2 is a diagram showing display contents of an auxiliary display part of the electronic apparatus on an enlarged scale.

FIG. 2 is a diagram showing display contents of the auxiliary display part 5 of the electronic apparatus shown in FIG. 1 on an enlarged scale. In this embodiment, the display contents of the auxiliary display part 5 in a normal operation mode, other than a diagnosis mode, include battery level displays 11 and 12 which indicate a remaining amount of one or more battery parts. The auxiliary display part 5 is also provided with parts which may substitute for LEDs or the like which turn ON when making a capital letter input (Caps Lock), a numerical input (Num Lock), a scroll input (Scroll Lock) and the like. These parts of the auxiliary display part 5 may be provided separately in the keyboard 3 or its periphery, instead of being included in the auxiliary display part 5.

Figure 3:
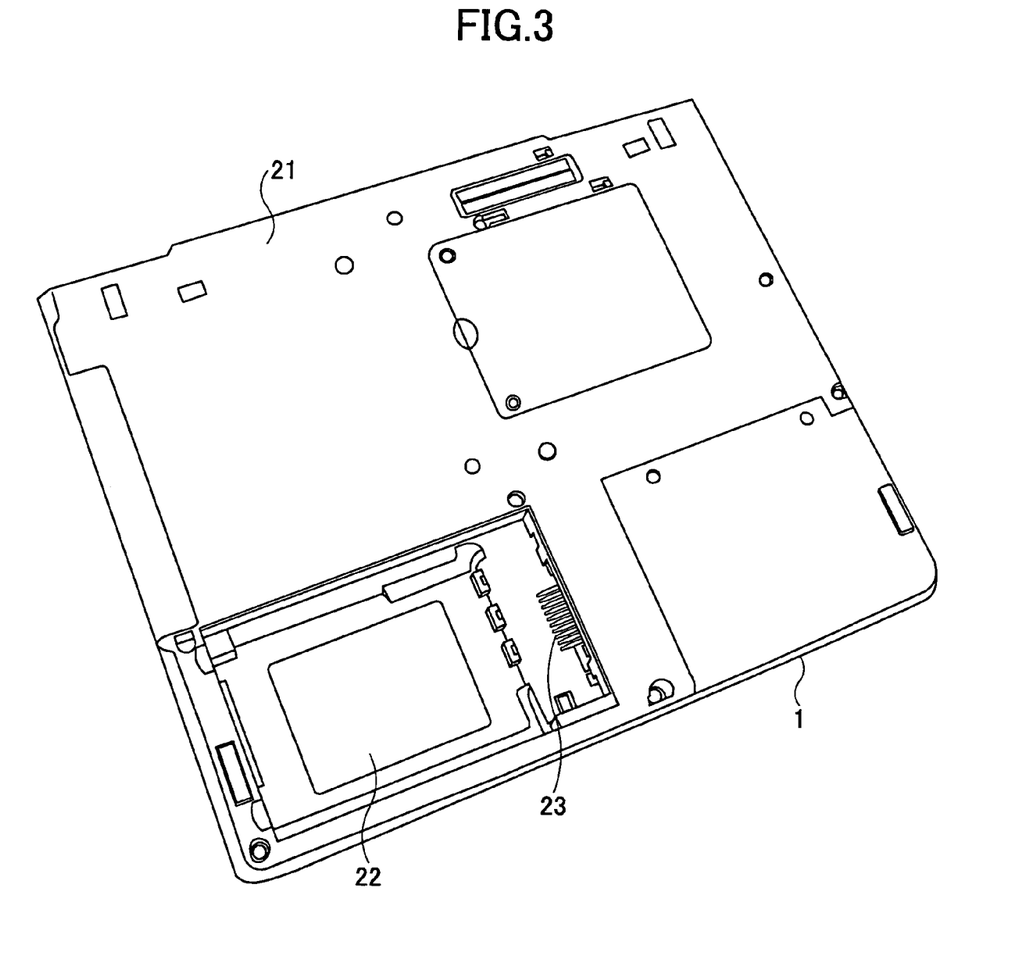
FIG. 3 is a bottom view showing the electronic apparatus in a state where a battery pack is removed.
Figure 4:
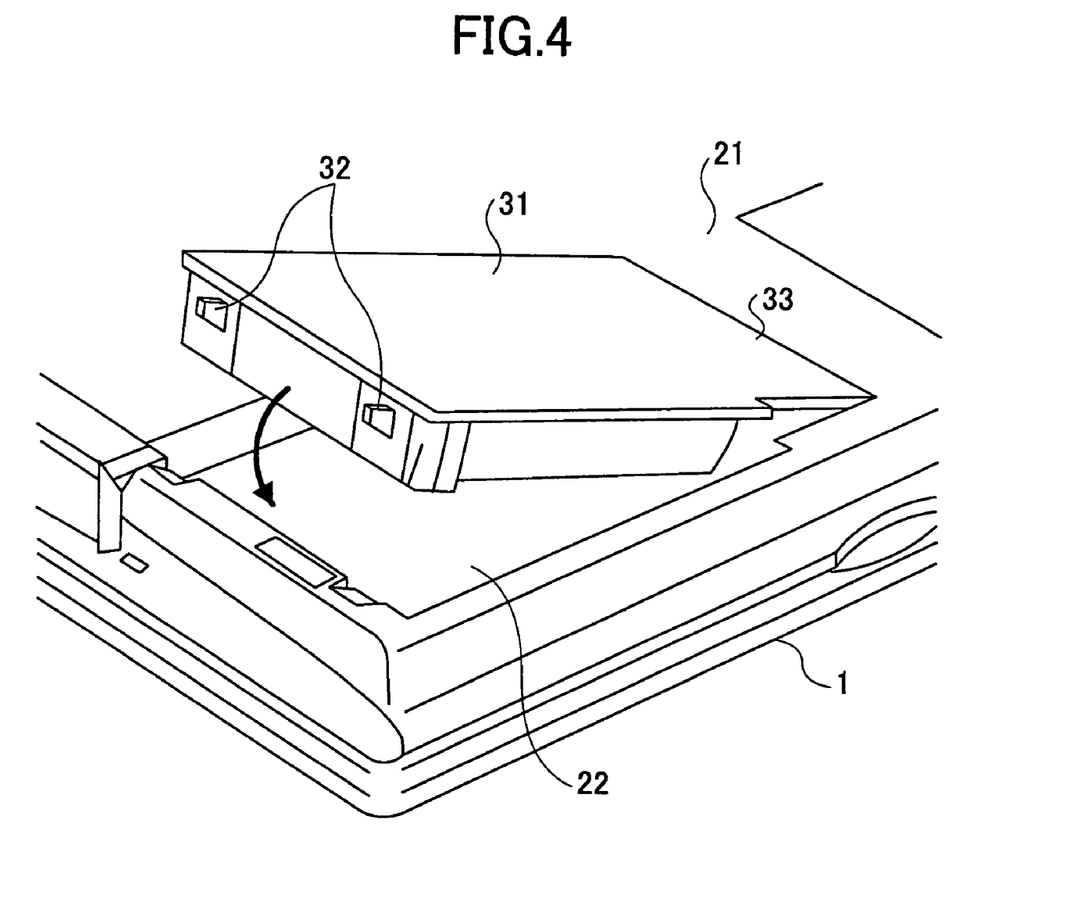
FIG. 4 is a diagram for explaining loading and removal of the battery pack with respect to the electronic apparatus.

FIG. 3 is a bottom view showing the electronic apparatus shown in FIG. 1 in a state where a battery pack is removed, and FIG. 4 is a diagram for explaining loading and removal of the battery pack with respect to the electronic apparatus. In the state shown in FIG. 3, a recess 22 for accommodating a battery pack 31 is provided in a bottom surface 21. Terminals 23 which connect to terminals 33 of the battery pack 31 are provided within the recess 22. The battery pack 31 that is loaded into the recess 22 may be removed from the electronic apparatus as shown in FIG. 4 by manipulating claws 32. On the other hand, by loading the battery pack 31 into the recess 22 as shown in FIG. 4, the claws 32 engage corresponding locking parts of the electronic apparatus, to hold the battery pack 31 within the recess 22. In the state where the battery pack 31 is held within the recess 22, the terminals 33 of the battery pack 31 connect to the corresponding terminals 23 within the recess 22. In addition, one surface of the battery pack 31 forms a portion of the bottom surface 21 of the electronic apparatus. Of course, a lid may be provided separately to close the recess 22 instead of closing the recess 22 by the face of the battery pack 31.

Figure 5:
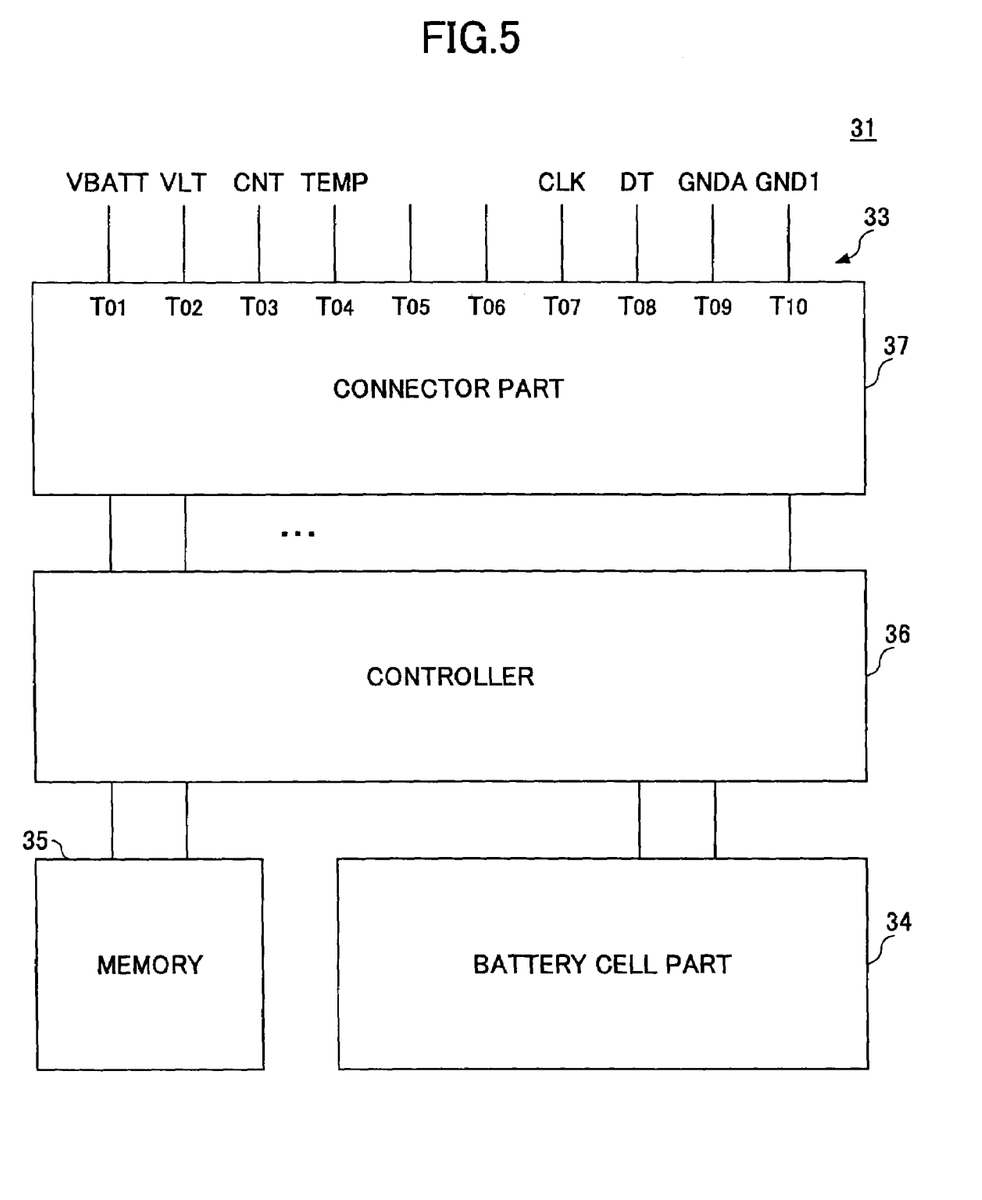
FIG. 5 is a system block diagram showing an embodiment of the battery pack according to the present invention.

FIG. 5 is a system block diagram showing an embodiment of the battery pack according to the present invention. The battery pack 31 shown in FIG. 5 includes a battery cell part 34, a memory 35, a controller 36 and a connector part 37. The battery cell part 34 has a known structure made up of a plurality of chargeable battery cells for supplying a power supply voltage VBATT. For example, the battery cell part 34 may be made up of a plurality of battery cell groups that are connected in parallel, where each battery cell group is made up of a plurality of battery cells that are connected in series. The memory 35 stores data (information) related to the battery pack 31. The data (information) related to the battery pack 31 includes identification (ID) information for identifying the type and/or the supplying voltage of the battery pack 31, information related to a tolerable temperature within the battery pack 31, log information related to the use of the battery pack 31 such as the number of times the battery pack 31 is used. Depending on the specifications of the battery pack 31, a RAM, a ROM and/or other types of storage devices may be used for the memory 35, and any type or structure may be used for the memory 35 as long as it is possible to realize the present invention. The controller 36 includes elements (not shown) for detecting the temperature of the battery cell part 35 or the temperature within the battery pack 31, a circuit (not shown) for preventing overdischarge and overcharging of the battery cell part 35, and the like. But since a known structure may be employed for the controller 36, a detailed description of the controller 35 will be omitted in this specification. The connector part 37 includes the terminals 33 that are connectable to the corresponding terminals 23 of the electronic apparatus. The element that detects the temperature may of course be provided externally to the controller 36.

In this embodiment, the connector part 37 of the battery pack 31 includes, as the terminals 33, 10 terminals T01 through T10 having terminals numbers T01 through T10. The terminals T01 and T10 are used to supply the power supply voltage VBATT from the battery cell part 34 to the electronic apparatus, and the terminal T10 is used as a ground (GND1). When measuring the power supply voltage VBATT in order to carry out a process such as a management process to manage the charge state and/or the discharge state of the battery pack 31 within the electronic apparatus, a relatively large current flows through the terminal T01, and for this reason, the measured voltage may become unstable if the voltage from the terminal T10 is measured directly. Hence, in this embodiment, a voltage VLT for the measurement, obtained from the terminal T02 through which a relatively small current flows, is supplied to the electronic apparatus. A control signal CNT from the electronic apparatus, which puts the terminal T01 in a connected state and enables the supply of the power supply voltage VBATT when the battery pack 31 is loaded into the electronic apparatus, is supplied to the terminal T03. In the state where the battery pack 31 is not loaded into the electronic apparatus, no control signal CNT is supplied to the terminal T03 and the terminal T01 is put into a non-connected state, to thereby prevent the power supply voltage from being accidentally obtained from the terminals T01 and T10. A switch (not shown) that switches the terminal T01 between the connected state and the non-connected state based on the control signal CNT may be provided within the connector part 37 or within the controller part 36.

A temperature detection signal TEMP from the terminal which detects the temperature within the battery pack 31 is output from the terminal T04 and supplied to the electronic apparatus. In this embodiment, the terminals T05 and T06 are reserve terminals. A clock signal CLK that is used when carrying out a read or a write with respect to the memory 35 is supplied to the terminal T07 from the electronic apparatus. At the time of the read, data (information) DT read from the memory 35 within the battery pack 31 is output from the terminal T08 and supplied to the electronic apparatus. On the other hand, at the time of the write, data (information) DT to be written into the memory 35 within the battery pack 31 is supplied to the terminal T08 from the electronic apparatus. The terminal T09 is used as a ground (GNDA) for analog signals. The signals VLT and TEMP output from the terminals T02 and T04 are analog signals, and for this reason, if the terminal T10 through which the relatively large current flows is used as the ground for these analog signals VLT and TEMP, the analog signals VLT and TEMP may become unstable due to the effects of the large current. Accordingly, in this embodiment, the terminal T09 is provided separately as the ground (GNDA) for the analog signals VLT and TEMP output from the terminals T02 and T04. Of course, the terminals T03 and T09 are not essential. In this embodiment, the battery pack 31 only needs to be provided with at least the terminals T01, T07, T08 and T10.

In this embodiment, the reading and writing of the data DT with respect to the memory 35 are carried out via the controller 36, however, it is not essential to carry out the reading and the writing via the controller 36. In addition, although the temperature detection signal TEMP is output via the controller 36 in this embodiment, a temperature detection signal may be output to the terminal T04 directly from the element which detects the temperature.

Figure 6:
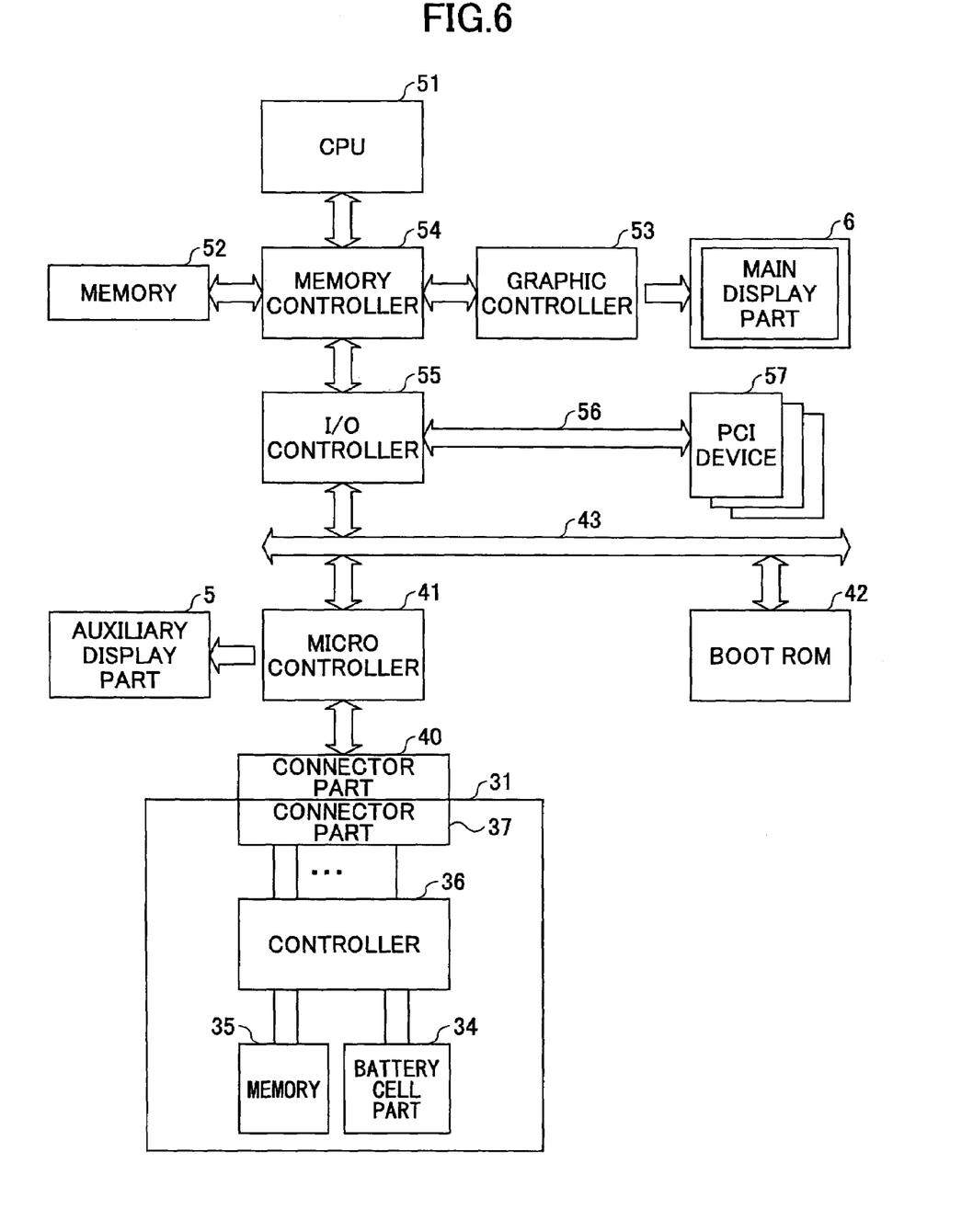
FIG. 6 is a system block diagram showing a structure of the electronic apparatus together with the battery pack.

FIG. 6 is a system block diagram showing a structure of the electronic apparatus together with the battery pack. In FIG. 6, those parts which are the same as those corresponding parts in FIG. 5 are designated by the same reference numerals, and a description thereof will be omitted. FIG. 6 shows a state where the connector part 37 of the battery pack 31 is connected to a connector part 40 of the electronic apparatus. The connector part 40 has the terminals 23 shown in FIG. 3, and forms an SM bus together with the terminals 33 of the connector part 37.

The electronic apparatus includes the auxiliary display part 5, the connector part 40, a microcontroller 41, a boot ROM 42, an LPC bus 43, a CPU 51, a memory 52, a graphic controller 53, a memory controller 54, an input/output (I/O) controller 55, a PCI bus 56, a PCI device 57 and the main display part 6 which are connected as shown in FIG. 6.

The microcontroller 41 forms an embodiment of the power supply control device according to the present invention, and controls the power supply with respect to the electronic apparatus. The boot ROM 42 stores programs such as the BIOS that is embedded with the POST. The microcontroller 41 and the boot ROM 42 are connected to the LPC bus 43. Although the illustration is omitted in FIG. 6, in a state where the electronic apparatus connected to a commercial power supply, the power supply voltage VBATT is also supplied to the microcontroller 41 from a transformer which transforms an A.C. power supply voltage from the commercial power supply into a D.C. power supply voltage. The transformer may be provided within the electronic apparatus or, a D.C. power supply voltage may be supplied to the electronic apparatus from an A.C. adaptor which is connected to the commercial power supply. The auxiliary display part 5 displays the data supplied thereto under the control of the microcontroller 41 or the CPU 51.

The CPU 51 controls the entire electronic apparatus. The memory 52 stores programs to be executed by the CPU 51, and various data including operation data and the like such as intermediate data of operations executed by the CPU 51. The memory controller 54 controls the write and read with respect to the memory 52 under the control of the CPU 51. The graphic controller 53 converts the data that is to be displayed into data having a format displayable on the main display part 6. The I/O controller 55 is connected to the PCI bus 56 and the LPC bus 43, and controls the input and the output with respect to the CPU 51.

Figure 7:
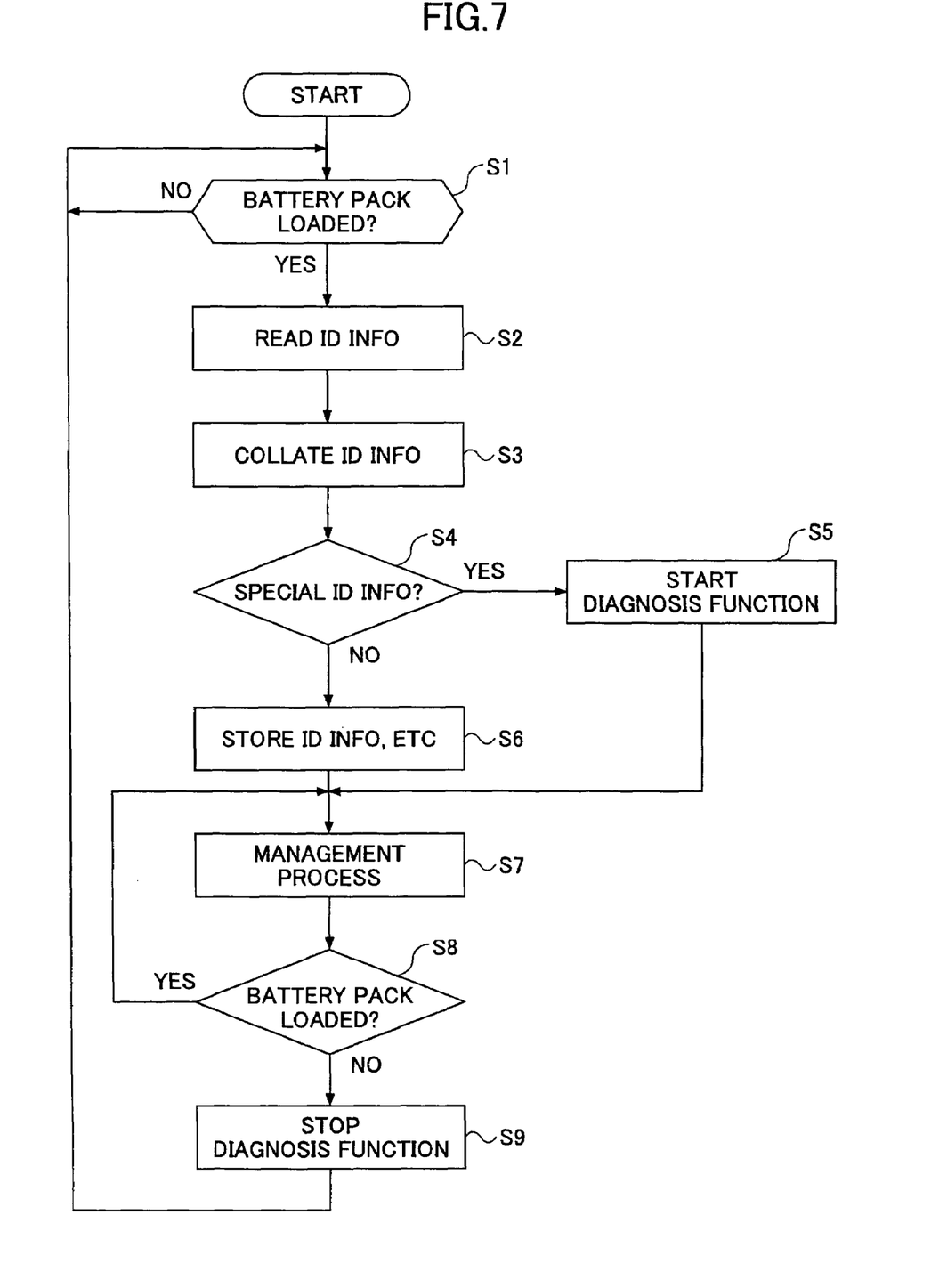
FIG. 7 is a flow chart for explaining an operation of a power supply control device.

FIG. 7 is a flow chart for explaining an operation of the power supply control device, that is, the microcontroller 41, and corresponds to an embodiment of the diagnosis method according to the present invention. An embodiment of a computer-readable storage medium according to the present invention stores a program which causes a computer such as a processor to carry out the operations of the microcontroller 41 shown in FIG. 7.

In FIG. 7, a step S1 decides, by a known method, whether or not the battery pack 31 is loaded into the electronic apparatus. When the battery pack 31 is loaded into the electronic apparatus, the terminals 33 of the battery pack 31 connect to the corresponding terminals 23 of the electronic apparatus. Hence, by detecting the voltage VBATT from the terminal T01 or the voltage VLT from the terminal T02 shown in FIG. 5, it is possible to judge whether or not the battery pack 31 is loaded into the electronic apparatus. If the decision result in the step S1 is YES, a step S2 reads, by a known method, the information stored in the memory 35 within the battery pack 31. In this embodiment, the ID information of the battery pack 31 is read from the memory 35. A step S3 collates the read ID information with ID information that is registered in advance within the electronic apparatus, and a step S4 decides whether or not the read ID information matches a special ID information that is registered in advance and indicates a diagnosis mode. The ID information that is registered in advance within the electronic apparatus includes the ID information of the battery packs from which the electronic apparatus will accept the power supply, and the special ID information that is used to set an operation mode of the electronic apparatus to the diagnosis mode. Such ID information may be stored within the microcontroller 41 or, stored in a memory within the electronic apparatus, such as the boot ROM 42 and the memory 52. The special ID information is set to a value that is different from that of the ID information of the normal battery pack by with which the electronic apparatus may be operated.

If the decision result in the step S4 is NO, the battery pack that is loaded into the electronic apparatus is not for the diagnosis use and is the normal battery pack that does not store the special ID information, and thus, the process advances to a step S6 which will be described later. On the other hand, if the decision result in the step S4 is YES, the battery pack 31 that is loaded into the electronic apparatus is for the diagnosis use and stores the special ID information, and hence, the process advances to a step S5. The step S5 issues an instruction that sets the operation mode of the electronic apparatus to the diagnosis mode, and starts the diagnosis function such as the POST of the BIOS stored in the boot ROM 42. Accordingly, the diagnosis function diagnoses the electronic apparatus by setting the electronic apparatus to the diagnosis mode, and displays a diagnosis result including debug information on the main display part 6, the auxiliary display part 5 or the indicator provided in the keyboard 3 and/or its peripheral part. It is desirable to store the diagnosis result in the memory within the electronic apparatus, such as the memory 52, as log information or the like, together with information related to the state of the electronic apparatus at a point in time when a failure or the like is generated. After the step S5, the process advances to a step S7 which will be described later.

Figure 8A:
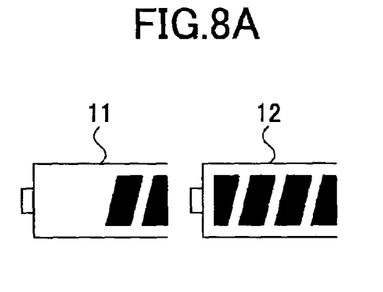
FIGS. 8A and 8B are diagrams for explaining displays made on the auxiliary display part when displaying a diagnosis result.
Figure 8B:
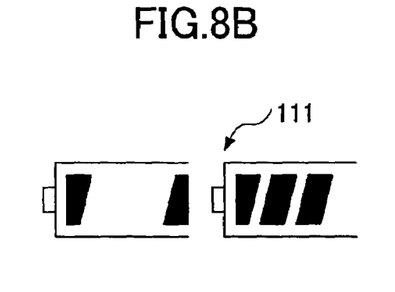

FIGS. 8A and 8B are diagrams for explaining displays made on the auxiliary display part 5 when displaying the diagnosis result. FIG. 8A shows the battery level displays 11 and 12 that are made on the auxiliary display part 5 in the normal operation mode, and FIG. 8B shows the diagnosis result, that is, debug information 111, displayed on the auxiliary display part 5 in the diagnosis mode.

In the case where the battery pack 31 is made up of a single battery part as in the case of this embodiment, each display segment of the battery level displays 11 and 12 shown in FIG. 8A corresponds to 12.5% of a maximum battery level. Hence, in the case shown in FIG. 8A, the battery level displays 11 and 12 indicate that the remaining battery level of the battery pack 31 is 75%. Of course, only one of the battery level displays 11 and 12 may be made active, so that each display segment of the active battery level display 11 or 12 corresponds to 35% of the maximum battery level.

In a case where the battery pack 31 is made up of mutually independent first and second battery parts, each display segment of the battery level displays 11 and 12 corresponds to 35% of the maximum battery level. In the case shown in FIG. BA, the battery level display 11 indicates that the remaining battery level is 50% for the first battery part, and the battery level display 12 indicates that the remaining battery level is 100% for the second battery part. In this case, at least 2 terminals must be provided in addition to the terminals 33 shown in FIG. 5 in order to supply the power supply voltage from the second battery part to the electronic apparatus.

On the other hand, in FIG. BB, the debug information 111 is indicated by 1 byte, and each display segment corresponds to 1 bit. In the case shown in FIG. BB, the debug information 111 indicates a diagnosis result code "10011110", that is, "9Eh" in hexadecimal. Accordingly, by using the auxiliary display part 4 that displays the status information in the normal operation mode, it is possible to display the diagnosis result, that is, the debug information 111 in the diagnosis mode. In addition, the diagnosis result may be displayed on the auxiliary display part 5 in the form of a diagnosis result code and/or a diagnosis result message.

Therefore, according to this embodiment, when the diagnosis which includes investigating the location of the failure within the electronic apparatus is carried out when shipping the personal computer, and attending to the maintenance, checking or repair of the personal computer, it is unnecessary to use an extension card and it is unnecessary to provide an extension slot in the electronic apparatus. In addition, the diagnosis function of the electronic apparatus can be started by a simple operation of replacing the normal battery pack that is loaded into the electronic apparatus with the battery pack 31 for the diagnosis use. The normal battery pack and the battery pack 31 for the diagnosis use may have the same structure and only the ID information stored in the memory 35 needs to be different between the two battery packs. Consequently, it is unnecessary to design and produce a battery pack exclusively for the diagnosis use. In addition, an existing basic structure of the electronic apparatus may be used, and the diagnosis function can be started based on the special ID information read from the battery pack 31 for the diagnosis use, by simply modifying the operation of the microcontroller 41 which functions as the power supply control device. When replacing the normal battery pack with the battery pack 31 for the diagnosis use, the information related to the state of the electronic apparatus at the time when the failure or the like is generated can positively be stored by continuing the supply of the power supply voltage to the electronic apparatus using the A.C. adaptor or the like, thereby making it possible to carry out an accurate diagnosis. Moreover, because the diagnosis function will not be started unless the battery pack 31 for the diagnosis use is loaded into the electronic apparatus, it is also possible to prevent the user of the electronic apparatus from accidentally starting the diagnosis function.

In possible, the diagnosis result may be displayed in the form of the diagnosis result code and/or the diagnosis result message on the main display part 6. In addition, the diagnosis result may be displayed in the form of the diagnosis result code on the indicator that is provided in the keyboard 3 and/or the periphery thereof. Furthermore, if possible, the diagnosis result can be displayed in the form of the diagnosis result code and/or the diagnosis result message using an arbitrary combination of two or more of the auxiliary display part 5, the main display part 6 and the indicator provided in the keyboard 3 and/or the periphery thereof.

Returning now to the description of FIG. 7, the step S6 stores the ID information and other information read from the memory 35 into the memory 52 or the like. Each information read from the memory 35 may be distinguished from other information by segmenting the information in units of bytes, for example. A step S7 carries out a management process to manage the charge state and the discharge state of the battery pack 31. A step S8 decides whether or not the battery pack 31 is loaded into the electronic apparatus, and the process returns to the step S7 if the decision result in the step S8 is YES. On the other hand, if the decision result in the step SB is NO, a step S9 stops the diagnosis function if started, and the process returns to the step S1.

Figure 9:
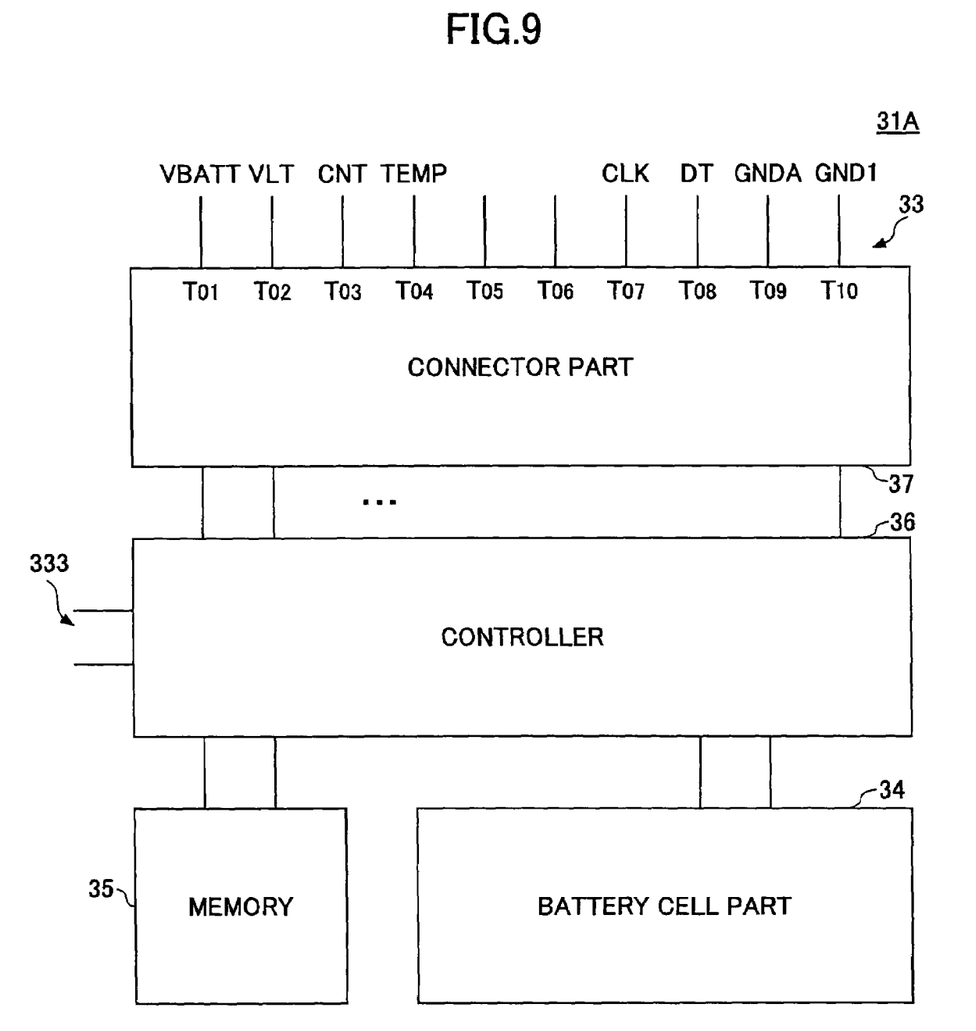
FIG. 9 is a system block diagram showing another embodiment of the battery pack according to the present invention.
Figure 10:
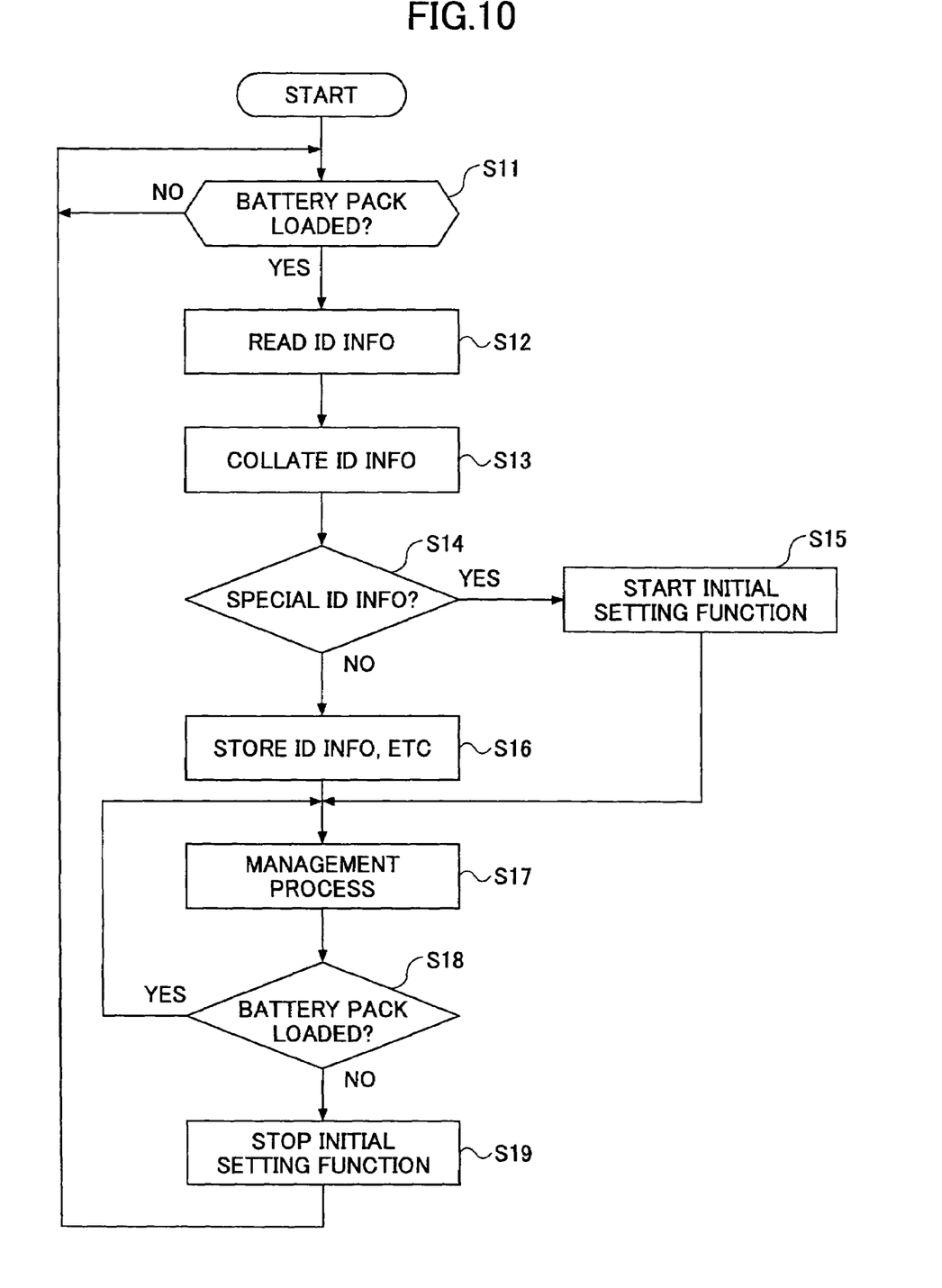
FIG. 10 is a flow chart for explaining an operation of the power supply control device.
Figure 11:
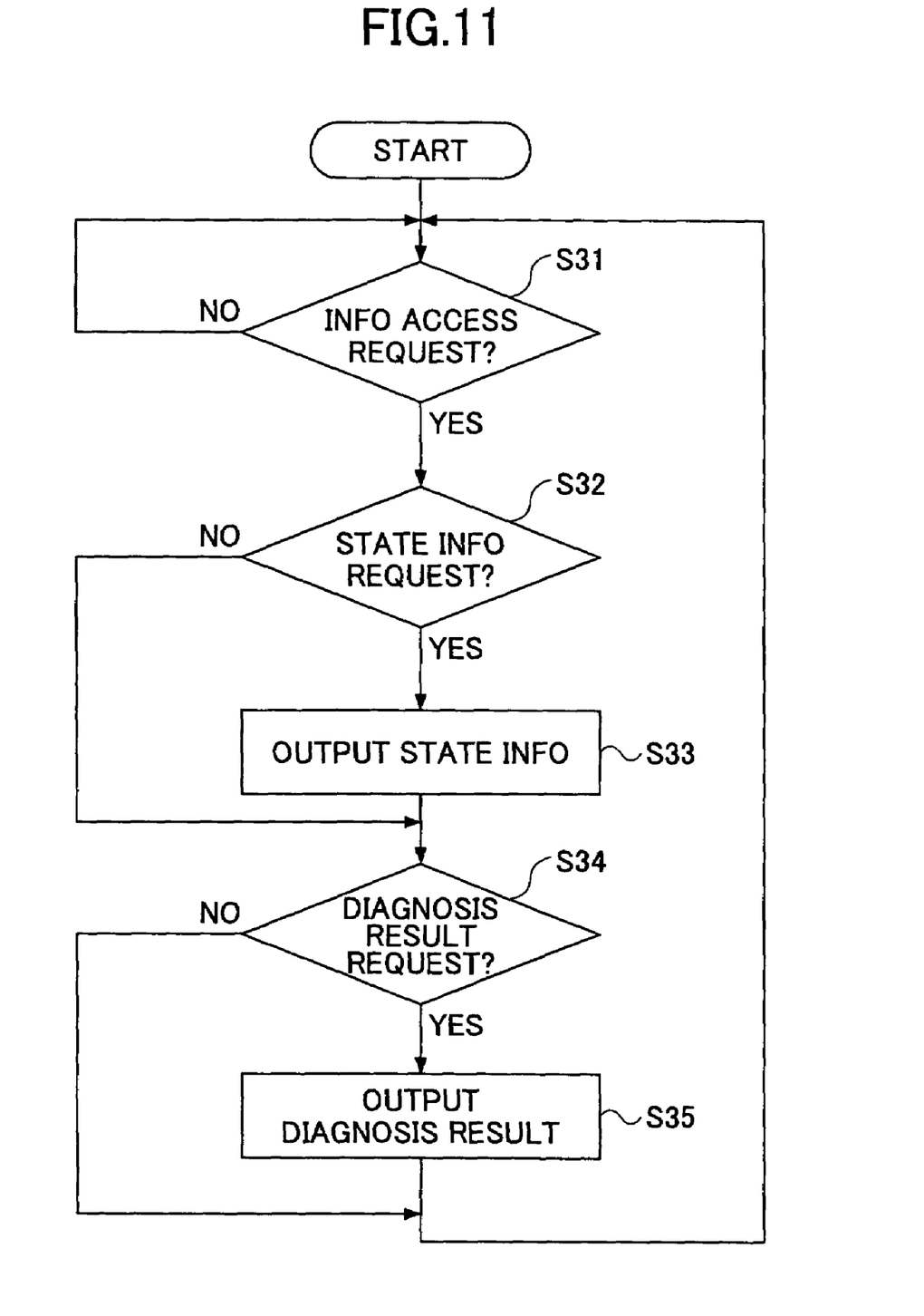
FIG. 11 is a flow chart for explaining another operation of the power supply control device.

Next, a description will be given of another embodiment of the power supply control device, the electronic apparatus, the battery pack and the computer-readable storage medium according to the present invention, by referring to FIGS. 9 through 11. FIG. 9 is a system block diagram showing this other embodiment of the battery pack according to the present invention, and FIGS. 10 and 11 are flow charts for explaining an operation of the power supply control device, that is, the microcontroller 41. This other embodiment of the electronic apparatus has the same basic structure as that of the embodiment described above, and illustration and description thereof will be omitted. In FIG. 9, those parts which are the same as those corresponding parts in FIG. 5 are designated by the same reference numerals, and a description thereof will be omitted.

In FIG. 9, a battery pack 31A is further provided with terminals 333. The terminals 333 may be connected to the terminals T07 and T08 of the connector part 37 via the controller 36 as shown in FIG. 9 or, may be connected directly to the terminals T07 and T08 of the connector part 37. The terminals 333 may include terminals for signals other than the clock signal CLK and the data DT.

This other embodiment of the computer-readable storage medium stores a program for causing a computer such as a processor to carry out the operation of the microcontroller 41 shown in FIG. 10 and/or FIG. 11.

In FIG. 10, a step S decides, by a known method, whether or not the battery pack 31A is loaded into the electronic apparatus. When the battery pack 31A is loaded into the electronic apparatus, the terminals 33 of the battery pack 31A connect to the corresponding terminals 23 of the electronic apparatus. Hence, by detecting the voltage VBATT from the terminal T01 or the voltage VLT from the terminal T02 shown in FIG. 9, it is possible to judge whether or not the battery pack 31A is loaded into the electronic apparatus. If the decision result in the step S11 is YES, a step S12 reads, by a known method, the information stored in the memory 35 within the battery pack 31A. In this embodiment, the ID information of the battery pack 31A is read from the memory 35. A step S13 collates the read ID information with ID information that is registered in advance within the electronic apparatus, and a step S14 decides whether or not the read ID information matches a special ID information that is registered in advance and indicates an initial setting mode. The ID information that is registered in advance within the electronic apparatus includes the ID information of the battery packs from which the electronic apparatus will accept the power supply, and the special ID information that is used to set an operation mode of the electronic apparatus to the initial setting mode. Such ID information may be stored within the microcontroller 41 or, stored in a memory within the electronic apparatus, such as the boot ROM 42 and the memory 52. The special ID information is set to a value that is different from that of the ID information of the normal battery pack by with which the electronic apparatus may be operated, and is also different from that of the special ID information indicating the diagnosis mode.

If the decision result in the step S14 is NO, the battery pack that is loaded into the electronic apparatus is not for the initial setting use and is the normal battery pack that does not store the special ID information, and thus, the process advances to a step S16 which will be described later. On the other hand, if the decision result in the step S14 is YES, the battery pack 31A that is loaded into the electronic apparatus is for the initial setting use and stores the special ID information, and hence, the process advances to a step S15. The step S15 issues an instruction that sets the operation mode of the electronic apparatus to the initial setting mode, and starts an initial setting function such as the BIOS stored in the boot ROM 42. Accordingly, the initial setting function sets the electronic apparatus to the initial setting mode, and by inputting external information obtained via the terminals 333 of the battery pack 31A, the initial setting function carries out the initial setting of the electronic apparatus based on the external information. After the step S15, the process advances to a step S17 which will be described later.

The step S16 stores the ID information and other information read from the memory 35 into the memory 52 or the like. Each information read from the memory 35 may be distinguished from other information by segmenting the information in units of bytes, for example. A step S17 carries out a management process to manage the charge state and the discharge state of the battery pack 31A. A step S18 decides whether or not the battery pack 31A is loaded into the electronic apparatus, and the process returns to the step S17 if the decision result in the step S18 is YES. On the other hand, if the decision result in the step S18 is NO, a step S19 stops the initial setting function if started, and the process returns to the step S11.

In FIG. 11, a step S31 decides whether or not the external information input to the electronic apparatus via the terminals 333 of the battery unit 31A is an information access request. If the decision result in the step S31 is YES, a step S32 decides whether or not the information access request includes a request for information related to the state of the electronic apparatus at the time when the failure or the like is generated. The process advances to a step S33 if the decision result in the step S32 is YES, and the process advances to a step S34 if the decision result in the step S32 is NO. The step S33 reads the information related to the state of the electronic apparatus at the time when the failure or the like is generated, from the memory of the electronic apparatus such as the memory 32, and outputs the read information to the battery pack 31A to be output via the terminals 333 of the battery pack 31A. The step S34 decides whether or not the information access request includes a request for the diagnosis result. The process advances to a step S35 if the decision result in the step S34 is YES, and the process returns to the step S31 if the decision result in the step S34 is NO. The step S35 reads the diagnosis request if the diagnosis result is stored in the memory of the electronic apparatus such as the memory 32, and outputs the read diagnosis result to the battery pack 31A to be output via the terminals 333 of the battery pack 31A, and the process returns to the step S31. Accordingly, the information related to the state of the electronic apparatus at the time when the failure or the like is generated and the diagnosis result may be output to an external device in response to the information access request, without having to provide exclusive terminals in the electronic apparatus, to thereby facilitate the diagnosis and repair of the electronic apparatus.

Of course, the electronic apparatus may carry out an arbitrary combination of two or more operations of the operations shown in FIGS. 7, 10 and 11.

In each of the embodiments described above, the battery pack is not provided with terminals for an address signals. However, in a case where a plurality of ID information and the like are stored in the memory within the battery pack and it is desirable to enable access to each individual information, terminals for the address signal may be provided on the battery pack, although the number of terminals will increase in this case.

The application of the present invention is not limited to the lap-top personal computer, and is applicable to any type of electronic apparatus which uses a battery pack and requires diagnosis. The electronic apparatus to which the present invention is applied does not necessarily have to be a portable apparatus.

Further, the present invention is not limited to these embodiments, but various variations and modifications may be made without departing from the scope of the present invention.

What is claimed is:

1. A diagnosis method for diagnosing an electronic apparatus that is operable with a detachable battery pack, comprising the steps of:

(a) judging a loaded battery pack; and (b) setting the electronic apparatus to a diagnosis mode in which the electronic apparatus is diagnosed when said step (a) judges that the loaded battery pack is a predetermined battery pack.

2. The diagnosis method as claimed in claim 1, further comprising the steps of:

(c) displaying a diagnosis result obtained by the electronic apparatus in the diagnosis mode on a display part and/or an indicator of the electronic apparatus.

3. The diagnosis method as claimed in claim 1, further comprising the steps of:

(d) outputting a diagnosis result obtained by the electronic apparatus in the diagnosis mode via the battery pack.

4. A power supply control device for controlling a power supply of an electronic apparatus that is operable with a detachable battery pack, comprising:

a judging part configured to judge a loaded battery pack; and a setting part configured to set the electronic apparatus to a diagnosis mode in which the electronic apparatus is diagnosed when said judging part judges that the loaded battery pack is a predetermined battery pack.

5. The power supply control device as claimed in claim 4, further comprising:

a displaying part configured to display a diagnosis result obtained by the electronic apparatus in the diagnosis mode on at least one of a display part and an indicator of the electronic apparatus.

6. The power supply control device as claimed in claim 4, further comprising:

an output part configured to output a diagnosis result obtained by the electronic apparatus in the diagnosis mode via the battery pack.

7. The power supply control device as claimed in claim 4, further comprising:

an input part configured to input information to the electronic apparatus via the battery pack.

8. An electronic apparatus operable with a detachable battery pack, comprising:

a judging part configured to judge a loaded battery pack; and a setting part configured to set the electronic apparatus to a diagnosis mode in which the electronic apparatus is diagnosed when said judging part judges that the loaded battery pack is a predetermined battery pack.

9. The electronic apparatus as claimed in claim 8, further comprising:

a diagnosing part configured to diagnose the electronic apparatus in the diagnosis mode; and a displaying part configured to display a diagnosis result obtained by the diagnosing part.

10. The electronic apparatus as claimed in claim 8, wherein said displaying part includes at least one element selected from a group consisting of a main display part, an auxiliary display part and an indicator.

11. The electronic apparatus as claimed in claim 8, further comprising:

an output part configured to output the diagnosis result obtained by the diagnosis part to an outside of the electronic apparatus via the battery pack.

12. The electronic apparatus as claimed in claim 8, further comprising:

an input part configured to input information to the electronic apparatus via the battery pack.

13. A computer-readable storage medium which stores a program for causing a computer to set to a diagnosis mode an electronic apparatus that is operable with a detachable battery pack, said program comprising:

a judging procedure causing the compute to judge a loaded battery pack; and a setting procedure causing the computer to set the electronic apparatus to a diagnosis mode in which the electronic apparatus is diagnosed when said judging procedure judges that the loaded battery pack is a predetermined battery pack.

14. The computer-readable storage medium as claimed in claim 13, said program further comprising:

a displaying procedure causing the computer to display a diagnosis result obtained by the electronic apparatus in the diagnosis mode on at least one of a display part and an indicator of the electronic apparatus.

15. The computer-readable storage medium as claimed in claim 13, said program further comprising:

an output procedure causing the computer to output a diagnosis result obtained by the electronic apparatus in the diagnosis mode via the battery pack.

16. A diagnosis method for diagnosing an electronic apparatus that is operable with a detachable battery pack, comprising:

setting the electronic apparatus to a diagnosis mode in which the electronic apparatus is diagnosed when it is determined by the electronic apparatus that the detachable battery pack is a predetermined battery pack.

* * * * *